Feb. 9, 1965   G. L. FISHER   3,169,176
INFINITE HEAT SWITCH FOR CONTROLLING A
PLURALITY OF HEATING ELEMENTS
Filed Nov. 7, 1960   3 Sheets-Sheet 1

INVENTOR.
Gene L. Fisher
BY
Frederick M. Ritchie
His Attorney

INVENTOR.
Gene L. Fisher
BY
Frederick M. Ritchie
His Attorney

Feb. 9, 1965  G. L. FISHER  3,169,176
INFINITE HEAT SWITCH FOR CONTROLLING A
PLURALITY OF HEATING ELEMENTS
Filed Nov. 7, 1960  3 Sheets-Sheet 3

INVENTOR
Gene L. Fisher
BY
Frederick M. Ritchie
His Attorney

United States Patent Office 3,169,176
Patented Feb. 9, 1965

3,169,176
INFINITE HEAT SWITCH FOR CONTROLLING A PLURALITY OF HEATING ELEMENTS
Gene L. Fisher, Flint, Mich., assignor to General Motors Corporation, Detroit, Mich., a corporation of Delaware
Filed Nov. 7, 1960, Ser. No. 67,838
5 Claims. (Cl. 200—38)

This invention relates to a domestic appliance and more particularly to an infinitely variable switch for controlling a plurality of electric range heating elements.

In the electric range art, an effort has been made to eliminate the multiple fixed position switches for controlling electrical heating elements on an electric range. The desire has been to use an infinitely variable control switch for pulsing the heating element on and off in accordance with the desired heat output. Various types of bimetal pulsers have been used in the prior art for producing infinitely variable heat output in accordance with the user's exact needs. But such prior art arrangements have generally required a separate pulsing unit for each heating element and it is to the consolidation of these controls into an improved infinitely variable single control for a plurality of heating elements that this invention is directed.

Accordingly, it is an object of this invention to provide a control for infinitely varying the rates of open to closed time in a circuit switch.

It is a further object of this invention to provide an infinitely variable control switch which includes a rotating cam for biasing a plurality of pulsing switches, each switch being positioned relative to the rotating cam in accordance with the desired heat output.

It is still another object of this invention to provide a single rotating cam having a single eccentric protuberance thereon for operating a plurality of heating element pulsing switches.

Further objects and advantages of the present invention will be apparent from the following description, reference being had to the accompanying drawings wherein preferred embodiments of the present invention are clearly shown.

Figure 1:
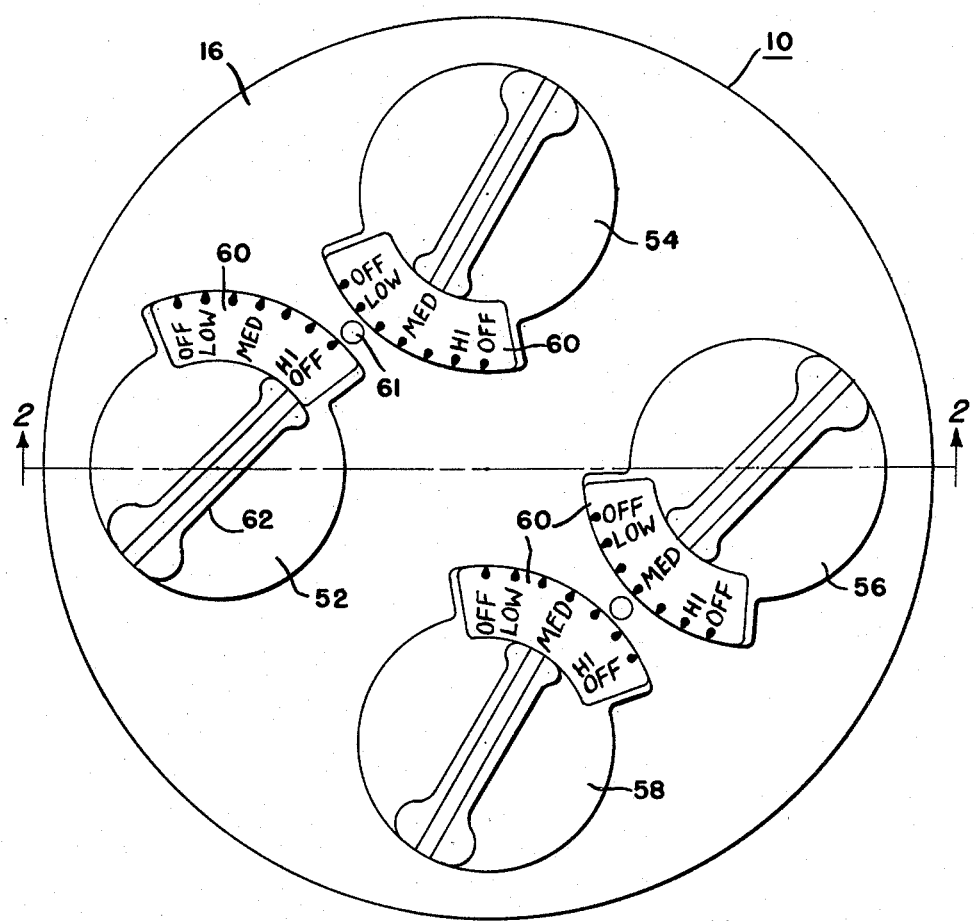
FIGURE 1 is a top elevational view of the infinitely variable control switch of this invention.
Figure 2:
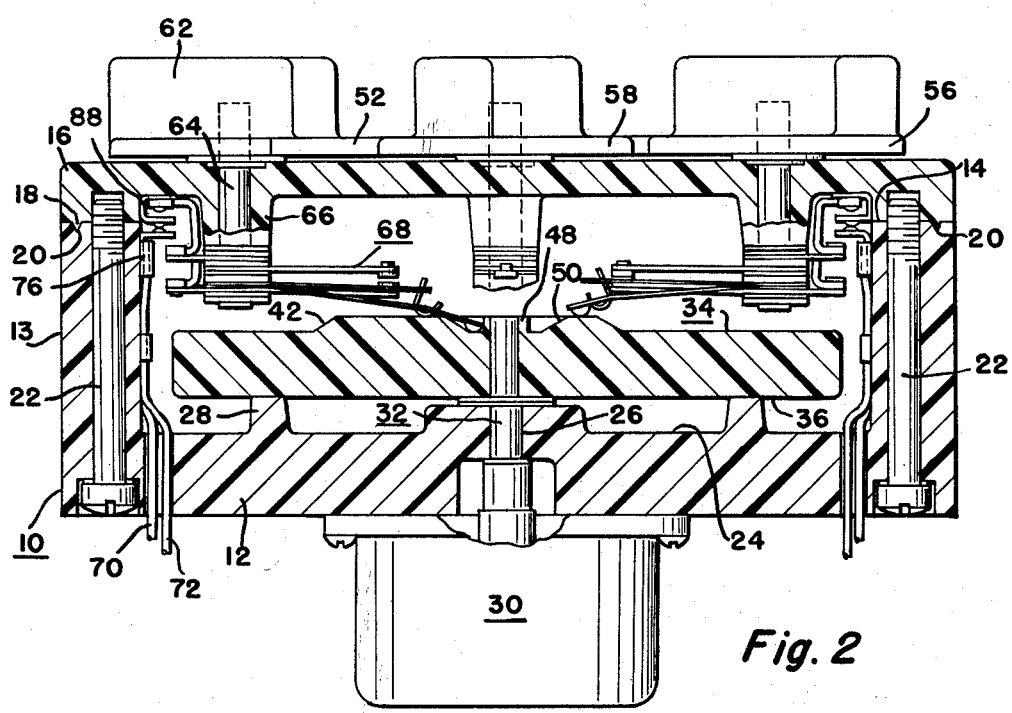
FIGURE 2 is a sectional view, partly in elevation, and with parts broken away, taken along line 2—2 in FIGURE 1.

In accordance with this invention with reference to FIGURES 1 and 2, an infinitely variable control unit 10 is illustrated. In general, the control unit provides a means for varying the length of off and on time for a repetitive timed switching cycle. The on time may be infinitely varied from zero to 100% of the cycle.

In general, the unit consists of one disc type cam driven by a synchronous motor and one or more switches mounted on pivotable arms attached to control knobs. The cam follower is attached mechanically to the switch actuator and rides on the face of the cam disc. As the control knob is rotated, the arm carrying the switch rotates in a plane parallel to the face of the cam disc thus placing the follower at various distances from the center of rotation of the cam. The center of rotation of the knob is located relative to the cam center such that the switch follower may be moved throughout the full radial range of the cam.

In particular and with reference to FIGURES 1 and 2, the control switch 10 is comprised of a receptacle casing or body portion 12 of plastic or other suitable material having a top opening 14 closable by a cover 16. The cover 16 may be molded of plastic and formed with a lock tab or key 18 which fits into a mating notch 20 on a cylindrical sidewall 13 of the receptable casing 12 to correctly locate cooperating elements. Fastening means such as a bolt 22 may be utilized to retain the cover member 16 on the receptable casing.

Figure 4:
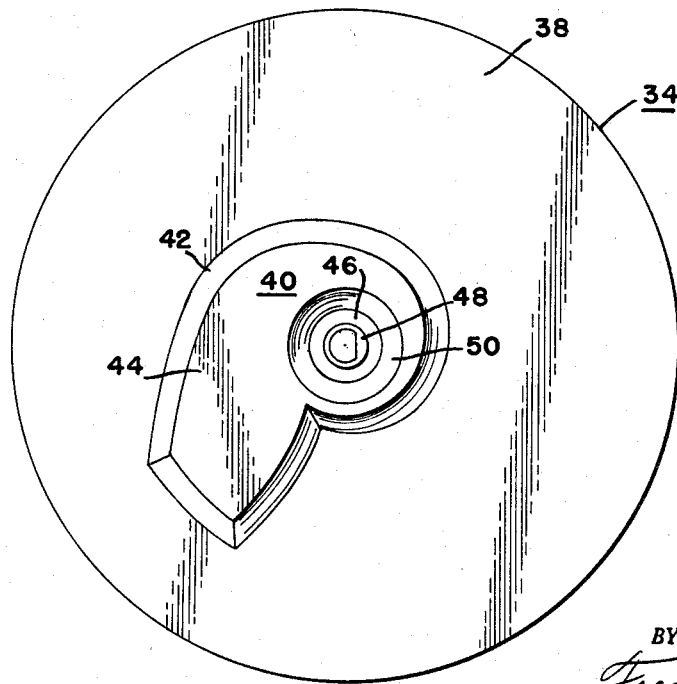
FIGURE 4 is a top elevational view of the rotating eccentric cam.

The molded plastic box-like receptacle casing 12 is formed with a bottom wall 24 having a shaft opening 26 and an integral annular bearing rib or protuberance 28. A synchronous motor 30 is connected to the outside of the receptacle casing wall 24 and includes a prime mover shaft 32 which extends through the opening 26 in the switch casing and has affixed thereto a circular disc type cam shown generally at 34 (FIGURE 4). When the cam disc 34 is keyed to the motor shaft 32, the annular boss or rib 28 acts as a bearing surface for supporting the flat under-side 36 of the cam disc.

Note in FIGURE 4 that the cam disc 34 is molded of plastic in a circular shape and includes a top surface 38 which has raised therefrom an irregular eccentric cam protuberance 40. The shape of the cam protuberance 40 is so designed that a switch operated thereby will be actuated for different percentages of on to off time depending on the radial relationship of the switch to the cam as will be described more fully hereinafter in connection with FIGURE 3. More particularly, the cam protuberance 40 is formed with a sloping outer ramp 42 leading to an eccentric plateau 44—the plateau terminating radially inwardly in an annular groove or trough 46 adjacent the cam collar 48. A sloping inner ramp 50 leads from the trough or channel 46 to the raised plateau 44.

Figure 6:
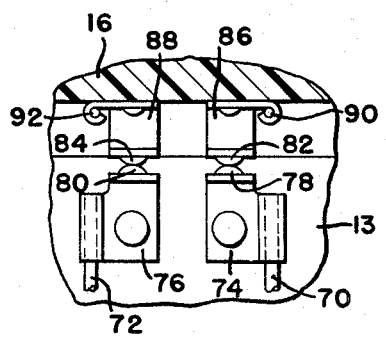
FIGURE 6 is a fragmentary elevational view taken generally along line 6—6 in FIGURE 5.

Returning to FIGURES 1 and 2, the switch cover 16 is shown to support a plurality of switch knobs 52, 54, 56, and 58. Each knob 52 carries an indicia portion 60 which is calibrated for Off, Low, Medium, High, and Off. By rotating the grip portion 62 of the switch knob, a shaft such as 64 is rotated. The explanation in connection with switch actuator or knob 52 and shaft 64 is believed to suffice for the remaining three switches 54, 56 and 58. Consequently explanation given in connection with switch 52 will be understood as exemplary of the other switch construction. The switch actuator shaft 64 is affixed as by a press fit into the knob 52 and extends through a ported boss 66 integral with the underside of the cover 16. Attached at the lower end of the switch shaft 64 and connected for pivotal movement therewith is a pulsing switch assembly shown generally at 68. The receptacle casing of the switch 10 includes a pair of fixed electrical conductors 70 and 72. With reference to FIGURE 6, the conductors 70 and 72 are connected to the cylindrical side wall 13 of the receptacle casing 12 by terminal connectors 74 and 76 fastened as by rivets to the side of the receptacle casing. These brackets include contact buttons 78 and 80 respectively which mate with contact 82 and 84 respectively on terminal spades 86 and 88 carried on the under side of the switch cover 16.

Suffice it at this point to note merely that the key action of 18 and 20 match the cover 16 to the cylindrical wall 13 of the casing and aligns the contact button 80 and 84 and 78 and 82 so that the infinitely controlled switch 10 cannot be incorrectly assembled. The cover spades 86 and 88 are electrically fastened to flexible electrical conductors 90 and 92 respectively which are in turn connected selectively to the pulsing switch assembly 68 as will be described more fully next following.

The detailed explanation of the pulsing switch assembly 68 will be given in connection with FIGURE 5. The actuator shaft 64 is machined to a smaller diameter portion 96 over which is press fit into affixed relationship an insulating bushing 98. The bushing 98 includes a keyway 100 or other suitable relative rotation prevention means for locking the pulsing switch assembly 68 for movement with the shaft 64. In stacked relationship on the bushing 98 is a brass washer 102 which serves as the bearing surface between the switch assembly 68 and the plastic cover boss or protuberance 66. Next, an insulating washer 106 is threaded onto the bushing 98. Following this, a metal upper conductor pivot arm 108 is keyed to the bushing 98 and includes an extending end portion 110 which connects to the terminus of the conductor 92. A metal electrically conducting washer 112 is interposed between the pivot arm 108 and the upper pulsing switch arm 114. A lower pulsing switch arm 116 is insulated from the upper switch arm 114 by means of an insulating washer 118 and the insulating bushing 98. In electrically connected engagement with the lower pulsing switch arm 116, is a support arm 120 which is keyed to the bushing 98 and has a portion 121 extending outwardly on the opposite side from the pulsing contacts 115, 117 into engagement with the terminal end of the conductor 90. A spring follower 122 for biasing the lower pulsing arm 116 electrically contacts the support arm 120 and the lower pulsing arm 116 at the actuator bushing and includes a follower button 124 which rides on the top surface 38 of the rotating cam disc 34. Snap action is facilitated by use of an overcenter spring member 126 which is believed conventional in the switch art. The stack-up on the control shaft 64 is completed by an insulating washer 130 and a spring washer 132 which is fastened as by a bolt 134 to the bottom end of the shaft portion 96. Thus, it should be seen that the manipulation of the switch 52 will rotate the shaft 64 and the entire pulsing switch assembly 68. Note that the conductor portions 90 and 92 will be sufficiently long and flexible to allow the maximum pivotal movement of the switch assembly 68. Again, it should be emphasized that the description given in connection with the switch 52 and the pulsing assembly 68 will suffice in connection with the remaining three pulsing switch assemblies controlled through the switch knobs 54, 56 and 58.

Figure 3:
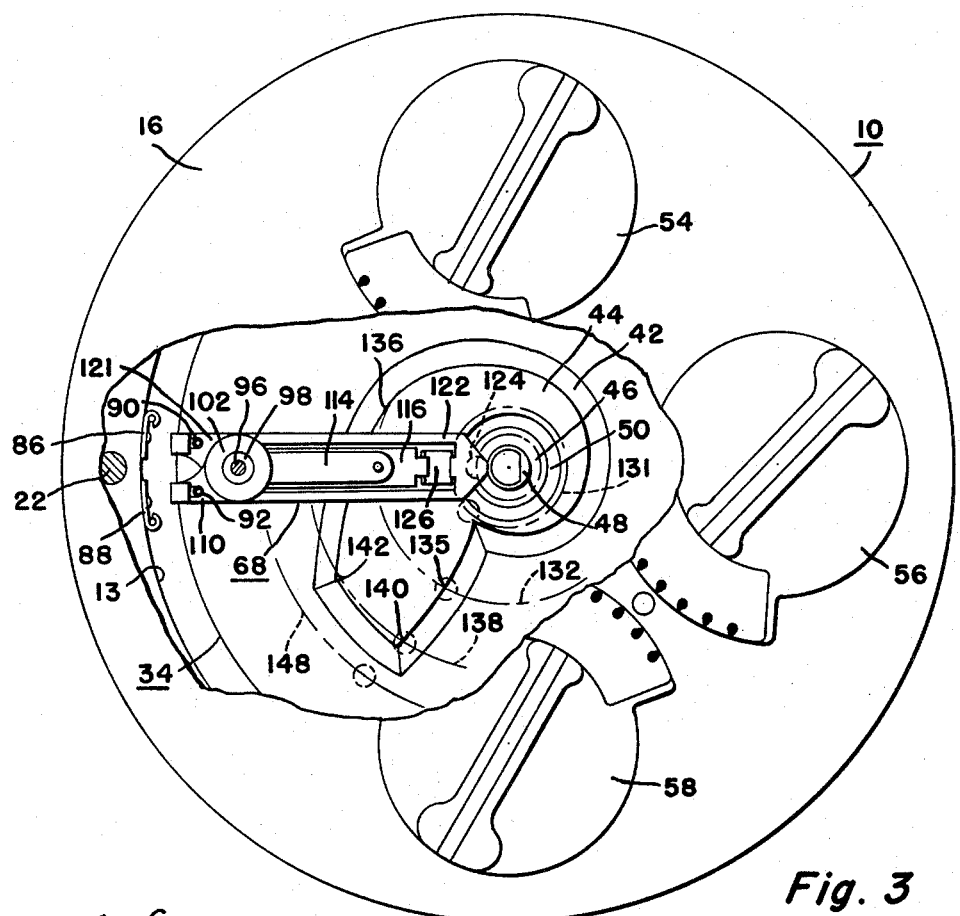
FIGURE 3 is a top elevational view with parts broken away to shown one of the pulsing switches of this invention in relationship to the rotating cam.
Figure 5:
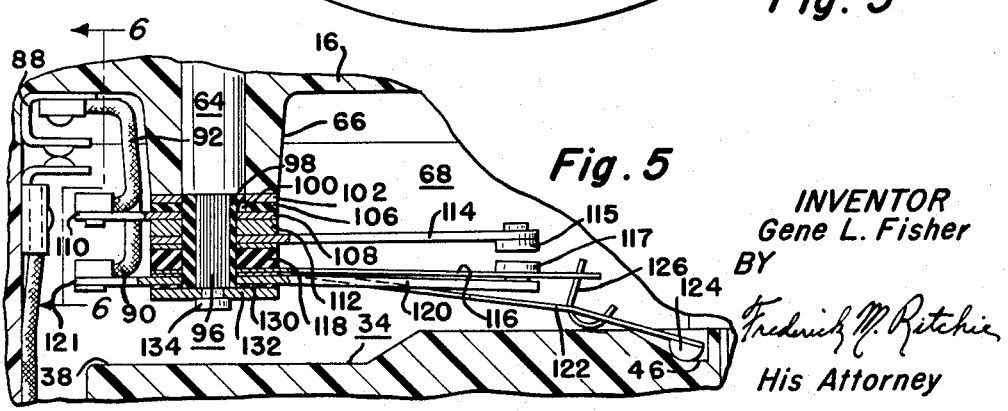
FIGURE 5 is an enlarged fragmentary sectional view of the pulsing switch and rotating cam.

In operation and with reference to FIGURES 1, 3 and 5 the control switch knob 52 is shown in the OFF position. Note that the follower button 124 resides in the bottom of the annular trough 46 on the rotating cam disc 34. In this position, the contact button 115 on the upper pulsing switch arm 114 and the contact button 117 on the lower pulsing switch blade 116 are permanently disengaged. Even when the motor 30 is energized and the disc 34 rotating therewith, the follower button 124 will not be displaced and will ride freely within the bottom of the trough or channel 46.

Consider now that the operator switches the knob 52 so that the High (HI) position is opposite the indicator point 61. This manual action will shift the entire pulsing switch assembly 68 in a clockwise direction as viewed in FIGURE 3. Thus, the follower button 124 will climb the ramp 50 leading from the annular channel to the top plateau 44 of the rotating protuberance 40. With the disc 34 rotating at a synchronous speed, it will be seen that the HI position will find the follower 124 tracing a path 131. Note that the path 131 is completely on top of the protuberance plateau 44 and the contacts 115 and 117 are engaged 100% of the time. If the switch were used to control an electrical heating element on an electric range, this would be equivalent to a full time energization of the heating element to accommodate the highest heat output setting.

Consider now that the actuator knob 52 is shifted further in the clockwise direction to the Medium (MED) setting. This will radially displace the follower button 124 from the center of the rotating disc 34 to a position where it will trace a path 132 on the top of the rotating cam disc 34. In this relationship, note that the contact buttons 115 and 117 will be closed only so long as the follower button 124 rides on the top plateau 44 of the eccentric protuberance 40—namely along the arc from the point 135 to the point 136. In this relationship, the contacts 115 and 117 will be closed approximately 50% of the time.

Next, the actuator button 52 may be rotated clockwise so that the LOW setting is positioned opposite the indicating point 61. This will rotate the pulsing switch assembly 68 to place the follower button 124 in a position to trace a path 138 on the top of the rotating cam disc 34. Only that portion of the traced path from 140 to 142 will find the follower button on the plateau 44. Thus, only this short distance will place the contact button 117 in contact with the contact button 115 and a relatively small percentage of On time to Off time will result.

If the actuator knob 52 is rotated to its farthest clockwise position, another OFF setting is realized when the follower button 124 is placed completely outside the eccentric protuberance 40 to trace a path 148 which lies completely on the outer flat surface 38 of the rotating cam disc 34. Here, too, the follower 124 will never be displaced and thus the contacts 115 and 117 will never become engaged. Thus, any electrical appliance connected through the conductors 70 and 72 to a power supply will be deenergized.

It should now be seen that an improved infinitely variable switching arrangement has been provided wherein a single rotating cam is effective to operate the pulsing assemblies of a plurality of switches. Such a device is particularly effective in operating selectively the heating elements of an electric range. Each of the four switch actuating knobs may be positioned independently of one another to control each of four different heating elements. A single synchronous motor rotating a single cam disc may control all of the switches and thus the heating elements simultaneously. The cam may be so designed that each switch is actuated or closed for different percentages of the cam cycle depending on its respective radial distance from the cam center. Any curve of percentage "ON" time vs. knob rotation can be accommodated by proper design of the cam protuberance thus providing an infinite power output control.

While the embodiments of the present invention as herein disclosed, constitute a preferred form, it is to be understood that other forms might be adopted.

What is claimed is as follows:

1. In an infinite control switch for a plurality of circuits, the combination of a drive shaft including means for selectively rotating said drive shaft, a switch housing supporting said means for rotating and enclosing said drive shaft, said housing having an open side, a cover removably closing said open side, said cover having a plurality of pivotable switch shafts thereon spaced from said drive shaft and parallel therewith, each of said switch shafts having fixed thereto for pivotal movement therewith a pair of switch contacts for one of said circuits and a follower means selectively biasing one of said contacts into engagement with the other of said contacts to close said one of said circuits through said contacts, a single cam disc on said drive shaft having an irregular eccentric portion adjacent said follower means and biasing said follower means in accordance with the rotation of said drive shaft and the irregularity of said eccentric portion, said follower means biasing said contacts into engagement when biased by said eccentric portion, said switch contacts and said follower means when pivoted simultaneously relative to said eccentric portion operating to vary the percent of closed time of said one of said circuits due to the irregularity of said eccentric portion.

2. In an infinite control switch for a plurality of circuits, the combination of a drive shaft including means for rotating said drive shaft, a switch housing supporting said means for rotating and said drive shaft and having an opening, a cover removably closing said opening and having a plurality of pivotable switch shafts thereon spaced from said drive shaft, each of said switch shafts having fixed thereto for pivotal movement therewith a pair of switch contacts for one of said circuits and a follower means selectively biasing said contacts into engagement with one another to close said one of said circuits through said contacts, a single, irregular eccentric member on said drive shaft adjacent said follower means and biasing said follower means in accordance with the rotation of said drive shaft and the irregularity of said eccentric member, said follower means closing said contacts when biased by said eccentric member, said follower means when pivoted relative to said eccentric member operating to vary the percent of closed time of said one of said circuits due to the irregularity of said eccentric member.

3. In an infinite control switch for a plurality of circuits the combination of a drive shaft including synchronous motor means for selectively rotating said drive shaft, a switch housing supporting said motor means and enclosing said drive shaft, a removable cover keyed to said housing along one side thereof and having a plurality of pivotable switch shafts thereon radially spaced from said drive shaft and parallel therewith, each of said switch shafts having fixed thereto for pivotal movement therewith a pair of switch contacts for one of said circuits and a follower means selectively biasing one of said contacts into engagement with the other of said contacts to close said one of said circuits through said contacts, a single cam disc on said drive shaft having an irregular eccentric portion substantially coplanar with said follower means and biasing said follower means in accordance with the rotation of said drive shaft and the irregularity of said eccentric portion, said follower means biasing said contacts into engagement when biased by said eccentric portion, and means for pivoting said switch contacts and said follower means simultaneously radially relative to said drive shaft, whereby said eccentric portion engages said follower means for different periods of time during each rotation of said drive shaft due to the irregularity of said eccentric portion.

4. An infinite switch comprising, a switch casing having an open receptacle and a cover keyed to said receptacle for covering said opening, first, second, third and fourth conductors in said receptacle having first, second, third and fourth terminal connectors, fifth, sixth, seventh and eighth conductors supported by said cover and having fifth, sixth, seventh and eighth terminal connectors engaging said first, second, third and fourth terminal connectors respectively, a pulsing switch assembly on said cover including a first portion having first switch blade connected to said fifth conductor, a second switch blade in juxtaposition to said first switch blade and connected to said sixth conductor, first follower means selectively biasing said second switch blade into engagement with said first switch blade and first means for pivoting said first and second switch blades and said first follower means as a unit, said pulsing switch assembly including a second portion having a third switch blade connected to said seventh conductor, a fourth switch blade in juxtaposition to said third switch blade and connected to said eighth conductor, second follower means selectively biasing said fourth switch blade into engagement with said third switch blade and second means for pivoting said third and fourth switch blades and said second follower means as a unit, and a single cam rotatably mounted in said receptacle and having an irregularly raised eccentric protuberance on one side thereof adjacent said first and second follower means, said first means for pivoting said first portion of said pulsing switch assembly and said second means for pivoting said second portion of said pulsing switch assembly being respectively effective to position the respective follower means of said first and second portions radially relative to said eccentric protuberance to trace respectively different portions of said eccentric protuberance in a manner to infinitely variably close said first and second switch blades and said third and fourth switch blades in accordance with the respective positioning of said first and second portions of said pulsing switch assembly and the irregularity of said eccentric protuberance.

5. A pulsing switch comprising, means forming a casing, first and second switch means pivotally supported on the same side of said casing and including a first and second pair of contacts, first and second follower means for selectively respectively biasing one of said contacts in each of said first and second contact pairs into engagement with the other of said contacts in each of said first and second contact pairs, and single cam means journaled on the opposite side of said casing from said first and second switch means and rotatable relative to said first and second follower means on the same side thereof for actuating said first and second follower means in accordance with the pivotal position of said first and second follower means relative to said single cam means, said single cam means including an irregular disc having different arc lengths of follower means actuation at different radial distances from the axis of rotation of said single cam means.

References Cited in the file of this patent
UNITED STATES PATENTS

| 2,636,949 | Hunter | Apr. 28, 1953 |
| 2,803,715 | Guth | Aug. 20, 1957 |
| 2,808,478 | Lieberman | Oct. 1, 1957 |
| 2,814,683 | Wharton | Nov. 26, 1957 |
| 2,848,569 | Moss et al. | Aug. 19, 1958 |